United States Patent
Tanide et al.

(10) Patent No.: US 10,025,286 B2
(45) Date of Patent: Jul. 17, 2018

(54) SIMULATION SYSTEM, PROGRAMMABLE CONTROLLER, SIMULATION DEVICE, AND ENGINEERING TOOL

(71) Applicant: Mitsubishi Electric Corporation, Tokyo (JP)

(72) Inventors: Hajime Tanide, Tokyo (JP); Kazuki Maeda, Aichi (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 126 days.

(21) Appl. No.: 14/896,698

(22) PCT Filed: Apr. 30, 2014

(86) PCT No.: PCT/JP2014/062020
§ 371 (c)(1),
(2) Date: Dec. 8, 2015

(87) PCT Pub. No.: WO2015/166563
PCT Pub. Date: Nov. 5, 2015

(65) Prior Publication Data
US 2016/0246278 A1    Aug. 25, 2016

(51) Int. Cl.
*G06F 17/50*    (2006.01)
*G05B 19/05*    (2006.01)

(52) U.S. Cl.
CPC .. *G05B 19/056* (2013.01); *G05B 2219/13004* (2013.01); *G05B 2219/13174* (2013.01); *G05B 2219/13186* (2013.01)

(58) Field of Classification Search
CPC ........ G05B 19/056; G05B 2219/13174; G05B 2219/13186; G05B 2219/13004

USPC .......................................................... 703/13
See application file for complete search history.

(56) References Cited

U.S. PATENT DOCUMENTS 7,974,828 B2 * 7/2011 Okamura ............. G05B 19/056
703/23
9,317,397 B2 * 4/2016 Narutani ............. G06F 11/3664
(Continued)

FOREIGN PATENT DOCUMENTS

CN        102804087 A     11/2012
DE   10 2006 043 390 A1    3/2008
(Continued)

OTHER PUBLICATIONS

Communication dated May 9, 2016 from German Patent Office in counterpart Application No. 11 2014 002 985.8.
(Continued)

*Primary Examiner* — Juan Ochoa
(74) *Attorney, Agent, or Firm* — Sughrue Mion, PLLC; Richard C. Turner

(57) ABSTRACT

A programmable controller includes a command executing engine unit that performs a user program and performs a computing process and nonvolatile memory that stores the result of the computing process. The command executing engine unit transitions to a temporary stop state in which a new cycle of computing process is not performed and stores the result of a cycle of computing process in the nonvolatile memory when the cycle of computing process of the user program ends, and releases the temporary stop state and transmits the result of the cycle of computing process stored in the nonvolatile memory to a simulation device when a stop release instructing command instructing to release the temporary stop state is received from the simulation device.

7 Claims, 6 Drawing Sheets

(56) References Cited

U.S. PATENT DOCUMENTS

| | | | |
|---|---|---|---|
| 9,360,861 B2* | 6/2016 | Hahn | G05B 19/4069 |
| 9,607,112 B2* | 3/2017 | Sakaguchi | G06F 17/5009 |
| 9,836,039 B2* | 12/2017 | Pruschek | G05B 19/182 |
| 2003/0078762 A1* | 4/2003 | Hashima | G06F 17/5009 703/13 |
| 2007/0233452 A1 | 10/2007 | Sasaki | |
| 2008/0091394 A1 | 4/2008 | Hahn et al. | |
| 2011/0184535 A1* | 7/2011 | Fischer | G05B 19/056 700/21 |
| 2013/0124184 A1 | 5/2013 | Sakaguchi et al. | |

FOREIGN PATENT DOCUMENTS

| | | |
|---|---|---|
| JP | 63-291156 A | 11/1988 |
| JP | 2002-297226 A | 10/2002 |
| JP | 2003-030251 A | 1/2003 |
| JP | 2004-046675 A | 2/2004 |
| JP | 2006-329788 A | 12/2006 |
| JP | 2007-265238 A | 10/2007 |
| JP | 2009-223588 A | 10/2009 |

OTHER PUBLICATIONS

Communication dated Oct. 31, 2016, from the State Intellectual Property Office of People's Republic of China in counterpart Application No. 201480041282.8.

Taiwan Office Action of TW Patent Application No. 103134711 dated Jul. 1, 2015.

International Search Report of PCT/JP2014/062020 dated May 27, 2014 [PCT/ISA/210].

Communication dated Jan. 19, 2016, issued by the Taiwan Patent Office in corresponding Taiwanese Application No. 103134711.

* cited by examiner

FIG. 1
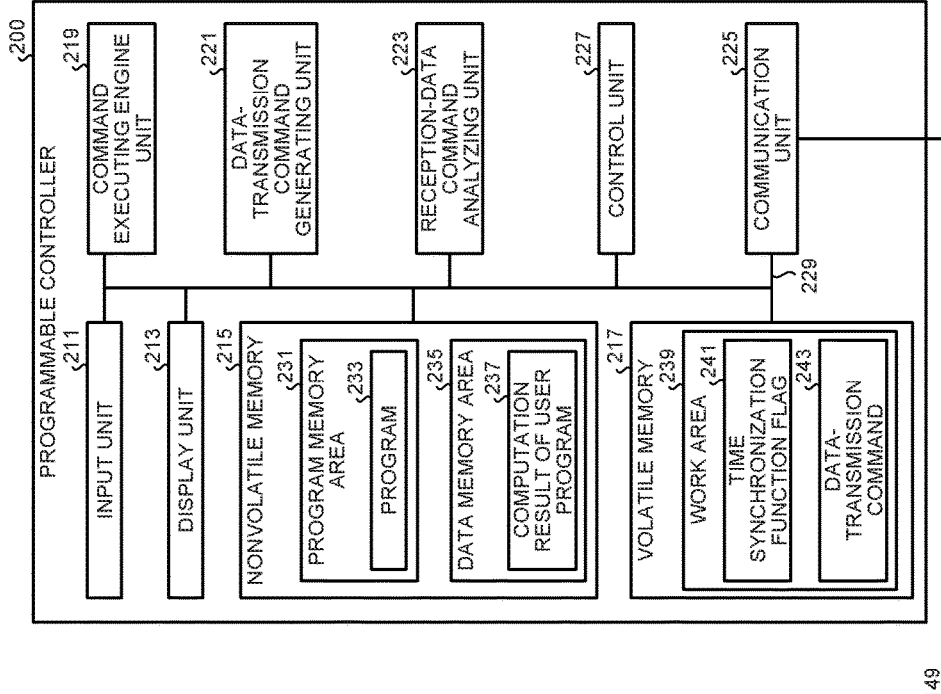
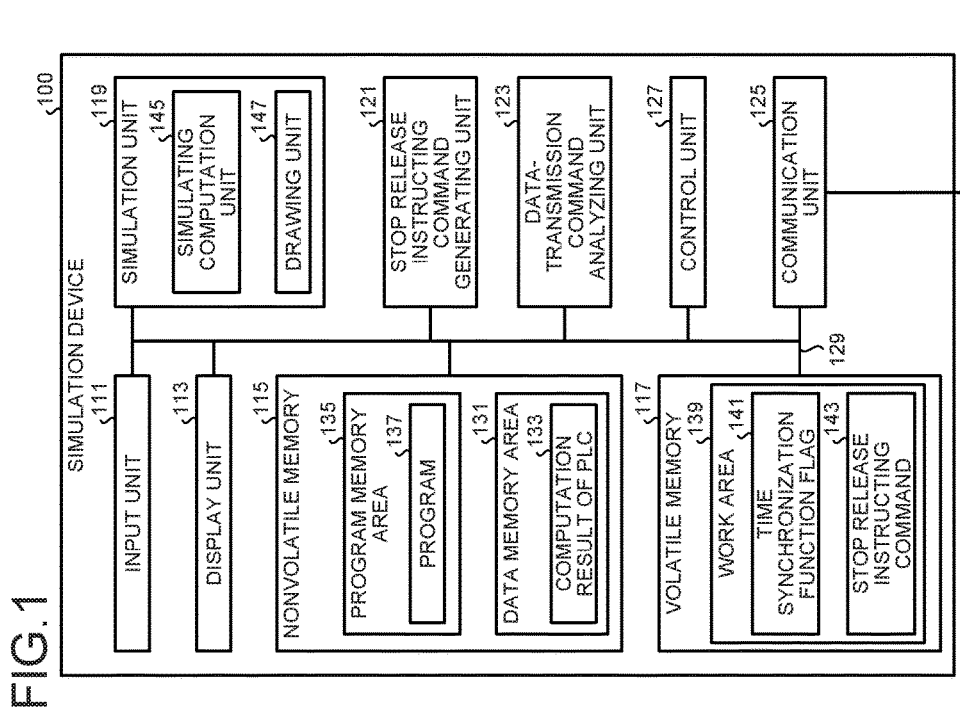

SIMULATION SYSTEM, PROGRAMMABLE CONTROLLER, SIMULATION DEVICE, AND ENGINEERING TOOL

CROSS REFERENCE TO RELATED APPLICATIONS

This application is a National Stage of International Application No. PCT/JP2014/062020, filed Apr. 30, 2014, the contents of which are incorporated herein by reference in its entirety.

FIELD

The present invention relates to a simulation system, a programmable controller, a simulation device, and an engineering tool.

BACKGROUND

In debugging using actual equipment in a process of developing manufacturing equipment, careful adjustment is required to prevent damage of facilities and workpieces due to interference of machines and thus a lot of development time is required. Accordingly, there is strong necessity for a 3D computer aided design (CAD) simulator that checks trajectory and interference of machines using a PC. In the 3D CAD simulator, debugging can be carried out without causing damage to facilities and workpieces due to interference of machines. Accordingly, in the 3D CAD simulator, careful adjustment is not necessary and it is possible to greatly reduce a debugging time.

However, in simulation of an actual programmable controller using a 3D CAD simulator, the number of cycles of the actual programmable controller per one cycle in the 3D CAD simulator is indefinite. Accordingly, data calculated by the actual programmable controller may not be reflected in the simulation in the 3D CAD simulator. Such a data reflection error causes a decrease in simulation accuracy.

Therefore, as a technique of matching the cycle of the simulation device with the cycle of the actual programmable controller, for example, a method of entering a waiting state after a programmable controller performs a cycle of scanning and performing a next cycle in response to a command from a simulation device has been proposed (for example, see Patent Literature 1).

CITATION LIST

Patent Literature

Patent Literature 1: Japanese Patent Application Laid-Open No. 2002-297226

SUMMARY

Technical Problem

However, according to the related art, in order to improve simulation accuracy, a designer needs to take measures of changing a user program of a programmable controller or the like. That is, in the related art, a designer synchronizes a cycle of time of the 3D CAD simulator with a cycle of time of the actual programmable controller by correcting the user program of the programmable controller or the like. However, this process forces the designer to bear an unnecessary burden and causes a problem in that a burden on the designer is great.

The present invention is made in consideration of the above-mentioned circumstances and an object thereof is to provide a simulation system, a programmable controller, a simulation device, and an engineering tool that can reduce a development time by performing a simulation with high accuracy without imposing a burden on a designer.

Solution to Problem

To solve the above described problem and achieve the object a simulation system according to the present invention includes: a programmable controller that controls a device to be controlled using a user program; and a simulation device that performs a simulation of simulating an operation of controlling the device to be controlled using the user program. The programmable controller includes: a computation unit that executes the user program and performs a computing process; and a storage unit that stores a result of the computing process. The computation unit transitions to a temporary stop state in which a new cycle of computing process is not performed and stores the result of a cycle of computing process in the storage unit when the cycle of computing process in the user program ends, and releases the temporary stop state and transmits the result of the cycle of computing process stored in the storage unit to the simulation device when the computation unit receives a stop release instructing command instructing to release the temporary stop state from the simulation device. The simulation device includes: a simulation unit that performs the simulation of simulating the operation of controlling the device to be controlled by controlling a two-dimensional shape model or a three-dimensional shape model of the device to be controlled; and a stop release instructing command generating unit that generates the stop release instructing command. The simulation unit performs a cycle of simulation based on the result of the cycle of computing process of the user program transmitted from the programmable controller, and transitions to a temporary stop state in which a new cycle of simulation is not performed and transmits the stop release instructing command generated by the stop release instructing command generating unit to the programmable controller when the cycle of simulation ends.

Advantageous Effects of Invention

According to the present invention, it is possible to reduce a development time by performing a simulation with high accuracy without imposing a burden on a designer.

BRIEF DESCRIPTION OF DRAWINGS

FIG. 1 is a diagram illustrating a simulation system according to a first embodiment of the present invention.

DESCRIPTION OF EMBODIMENTS

Figure 2:
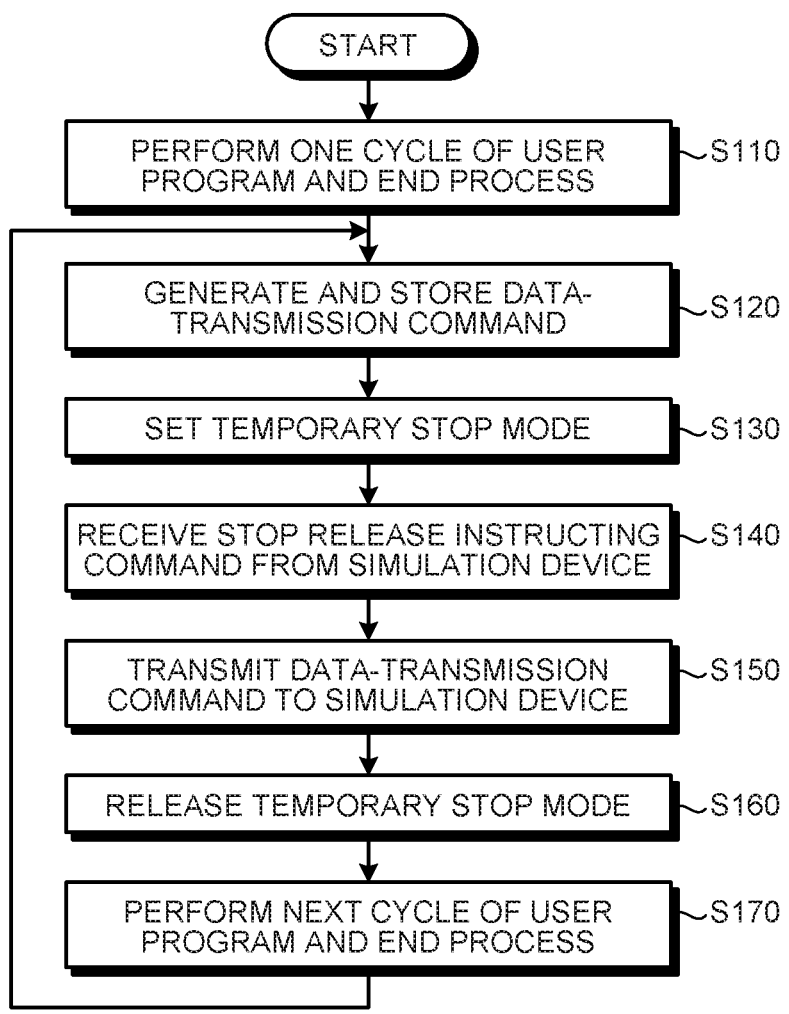
FIG. 2 is a flowchart illustrating a procedure in a PLC among simulation procedures in the simulation system according to the first embodiment of the present invention.

Hereinafter, a simulation system, a programmable controller, a simulation device, and an engineering tool according to embodiments of the present invention will be described in detail with reference to the accompanying drawings. The present invention is not limited to the following description, but can be appropriately modified without departing from the gist of the present invention.

First Embodiment

FIG. 1 is a diagram illustrating a simulation system according to a first embodiment of the present invention. The simulation system according to the first embodiment includes a simulation device 100 and a programmable controller (PLC: programmable logic controller) 200. The simulation device 100 simulates and displays an operation of a device to be controlled based on a computation result acquired from the PLC 200. The PLC 200 computes a command in accordance with a user program and outputs the computation result to the device to be controlled (not illustrated) connected to the PLC 200 to control the operation of the device to be controlled.

The simulation device 100 includes an input unit 111, a display unit 113, nonvolatile memory 115, volatile memory 117, a simulation unit 119, a stop release instructing command generating unit 121, a data-transmission command analyzing unit 123, a communication unit 125, and a control unit 127. These constituent units are connected to each other via an internal bus 129.

The input unit 111 is an input means configured to input a variety of information from a designer or an external device.

The display unit 113 is a display means configured to display a two-dimensional shape model or a three-dimensional shape model of a device to be controlled, a program, and a variety of other information in a simulation and an example thereof is an LCD (liquid crystal display device).

The nonvolatile memory 115 is a storage unit including a data memory area 131 in which a computation result 133 of the PLC 200 acquired from a data-transmission command transmitted from the PLC 200 as an analysis result of the data-transmission command is stored. Process data in the simulation device 100 is also stored in the data memory area 131. The nonvolatile memory 115 includes a program memory area 135 in which various programs 137 used to operate the simulation device 100, such as programs used by the simulation unit 119 to perform a simulation, are stored.

The volatile memory 117 is a storage unit including a work area 139 which is used for various processes in the simulation device 100. In the work area 139, flags, commands, and data are managed, and information such as a time synchronization function flag 141 and a stop release instructing command 143 is stored.

The simulation unit 119 performs a simulation. The simulation unit 119 includes a simulating computation unit 145 and a drawing unit 147. The simulating computation unit 145 performs a simulating computation on an operation of a device to be controlled based on the computation result of the PLC 200. The drawing unit 147 performs a computation for drawing a two-dimensional shape model or a three-dimensional shape model of the device to be controlled based on the computation result of the simulating computation unit 145, and draws the two-dimensional shape model or the three-dimensional shape model on the display unit 113 based on the computation result.

The stop release instructing command generating unit 121 generates a stop release instructing command instructing to release a temporary stop state of the PLC 200 when a temporary stop mode flag is set as the time synchronization function flag 141 in the work area 139 of the volatile memory 117.

The data-transmission command analyzing unit 123 analyzes the data-transmission command received from the PLC 200 and converts the data-transmission command into a format which is usable in the simulation device 100.

The communication unit 125 communicates with a communication unit 225 of the PLC 200 so as to transmit and receive data between the simulation device 100 and the PLC 200. The communication unit 125 and the communication unit 225 of the PLC 200 are connected to each other via a communication line 149. Communication means with the communication unit 225 is not particularly limited.

The control unit 127 controls the processes in the simulation device 100 as a whole.

The configuration of the PLC 200 will be described below. The PLC 200 includes an input unit 211, a display unit 213, nonvolatile memory 215, volatile memory 217, a command executing engine unit 219, a data-transmission command generating unit 221, a reception-data command analyzing unit 223, a communication unit 225, and a control unit 227. These constituent units are connected to each other via an internal bus 229.

The input unit 211 is an input means configured to input a variety of information from a user or an external device.

The display unit 213 is a display means configured to display a user program created by a designer and a variety of information input to and output from the PLC 200 and an example thereof is an LCD (liquid crystal display device).

The nonvolatile memory 215 is a storage unit including a program memory area 231 in which a program 233 such as various programs for operating the PLC 200 or the user program is stored and a data memory area 235 in which a computation result 237 of the user program is stored. Here, specific examples of the computation result of the user program include a position of an end effector and a moving speed of the end effector, for example, when the device to be controlled is a robot. For example, when the device to be controlled is a rotary press, the specific examples thereof include the number of revolutions and the rotation speed. For example, when the device to be controlled is a plant facility, the specific examples thereof include a process quantity.

The volatile memory 217 is a storage unit including a work area 239 which is used for various processes in the PLC 200. In the work area 239, flags, commands, and data are managed, and information such as a time synchronization function flag 241 and a data-transmission command 243 is stored.

The command executing engine unit 219 is a computation unit that performs a computation by executing commands of the user program based on the user program. The computation result is control data for controlling the device to be controlled.

The data-transmission command generating unit 221 generates a data-transmission command based on the data in the work area 239.

The reception-data command analyzing unit 223 analyzes reception data received from the simulation device 100 and converts the reception data into a format which is usable the PLC 200.

The communication unit 225 communicates with the communication unit 125 of the simulation device 100 so as to transmit and receive data between the PLC 200 and the simulation device 100. Communication means with the communication unit 125 is not particularly limited.

The control unit 227 controls the processes in the PLC 200 as a whole.

Figure 3:
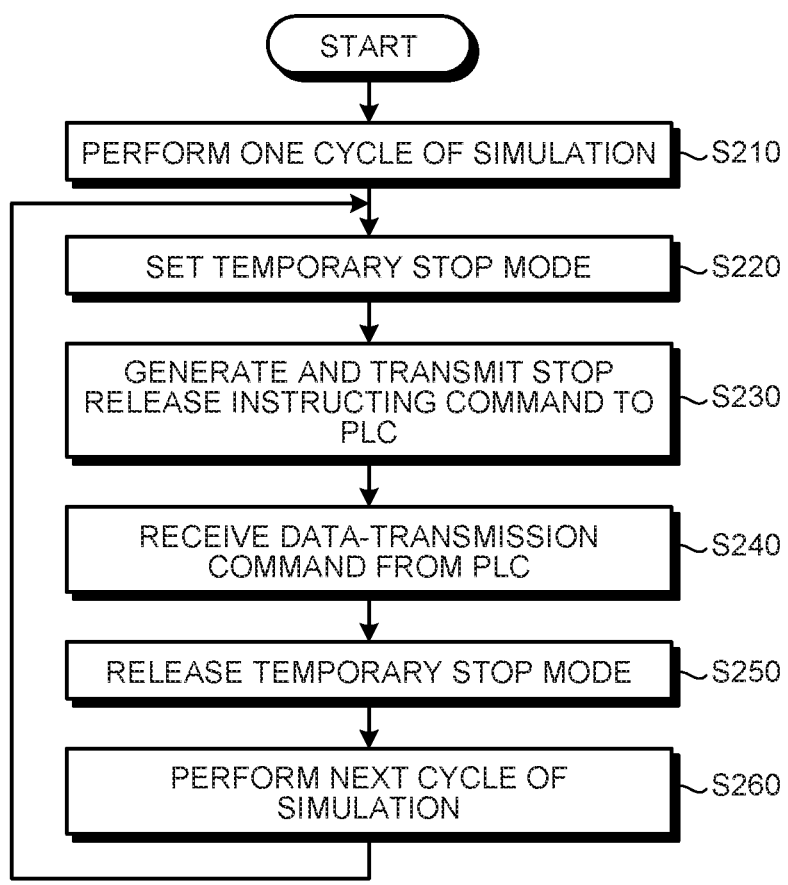
FIG. 3 is a flowchart illustrating a procedure in a simulation device among the simulation procedures in the simulation system according to the first embodiment of the present invention.
Figure 4:
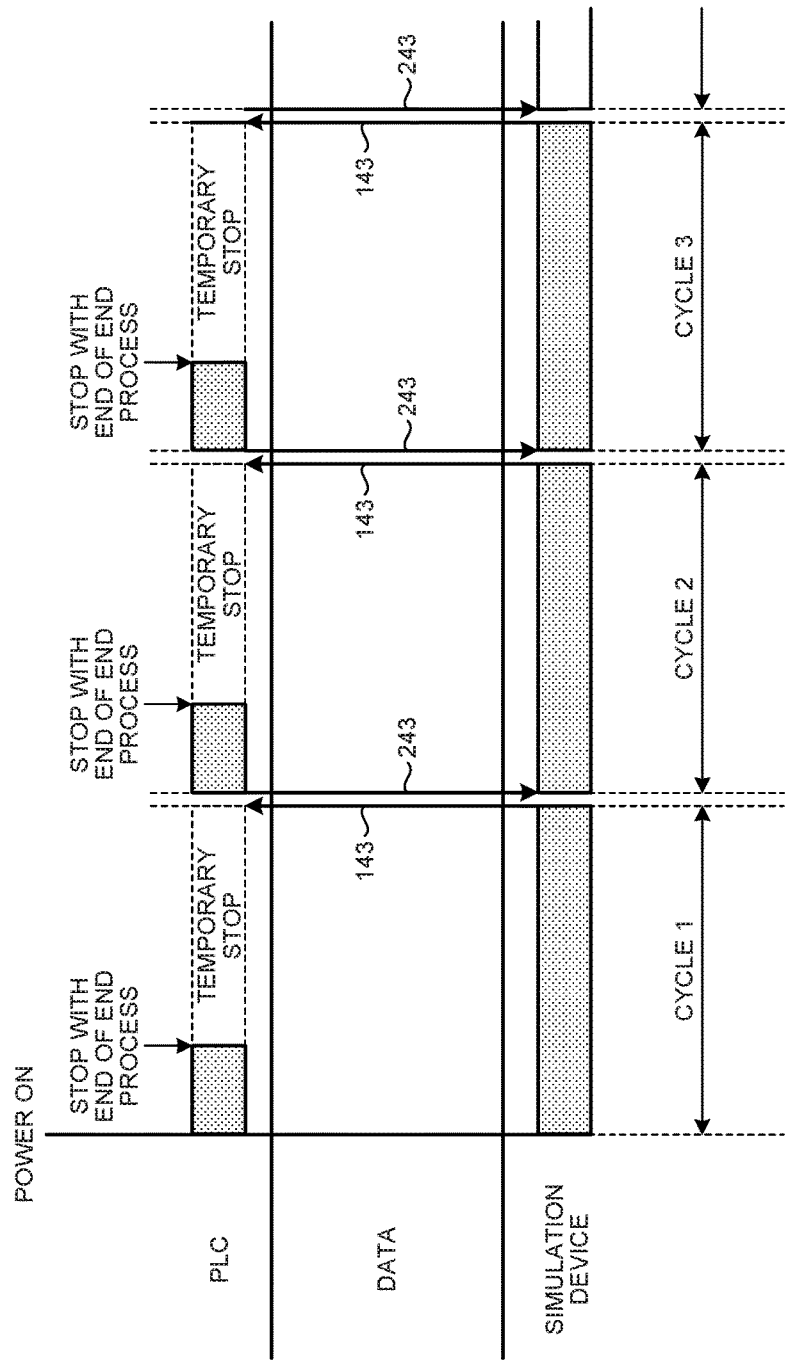
FIG. 4 is a diagram illustrating a process flow of a simulation in the simulation system according to the first embodiment of the present invention.

A simulation procedure in the simulation system will be described below. FIG. 2 is a flowchart illustrating a procedure in the PLC 200 among the simulation procedures in the simulation system according to the first embodiment. FIG. 3 is a flowchart illustrating a procedure in the simulation device 100 among the simulation procedures in the simulation system according to the first embodiment. FIG. 4 is a diagram illustrating a process flow of the simulation in the simulation system according to the first embodiment. In FIG. 4, hatched parts indicate times in which commands of the user program in the simulation device 100 are executed to perform a computing process or times in which the simulation in the PLC 200 is performed.

First, when the simulation device 100 and the PLC 200 are powered on, the command executing engine unit 219 in the PLC 200 performs a cycle of commands of the user program to be simulated based on predetermined initial data and performs a computation. When the computation of one cycle of the user program ends, the command executing engine unit 219 performs an end process (step S110). The end process is a process other than execution of commands, such as communication with an external device such as the simulation device 100. In the end process, the command executing engine unit 219 stores the computation result 237 of the user program in the data memory area 235 of the nonvolatile memory 215.

When the end process ends, the data-transmission command generating unit 221 generates a data-transmission command including the computation result 237 of the user program stored in the data memory area 235 and stores the generated data-transmission command as the data-transmission command 243 in the work area 239 of the volatile memory 217 (step S120).

When the end process ends, the command executing engine unit 219 sets the temporary stop mode flag as the time synchronization function flag 241 in the work area 239, that is, switches the temporary stop mode flag to an ON state (step S130). Accordingly, the command executing engine unit 219 transitions to the temporary stop mode and does not perform a computation and execution of the user program but enters a temporary stop state.

The temporary stop mode flag in the time synchronization function flag 241 of the PLC 200 is a flag indicating that the command executing engine unit 219 transitions to the temporary stop state in which commands of the user program are not executed. When the temporary stop mode flag is set, the command executing engine unit 219 transitions to the temporary stop state. When the temporary stop mode flag is released, that is, when the temporary stop mode flag is switched to an OFF state, the command executing engine unit 219 transitions to a normal mode in which commands of the user program are executed from the temporary stop state.

The function of causing the command executing engine unit 219 to transition to the temporary stop state by setting the temporary stop mode flag is installed in, for example, firmware in advance. Accordingly, processes such as creating a user program by a designer for utilizing the function of causing the command executing engine unit 219 to transition to the temporary stop state and changing of the user program are not necessary and a burden is not imposed on the designer.

On the other hand, when the simulation device 100 is powered on, the simulation unit 119 performs a cycle of simulation of the operation of the device to be controlled based on predetermined initial data (step S210). That is, the simulating computation unit 145 performs a simulating computation on the operation of the device to be controlled based on the predetermined initial data. Then, the drawing unit 147 performs a computation for drawing a three-dimensional shape model of the device to be controlled based on the computation result of the simulating computation unit 145 and draws the three-dimensional shape model on the display unit 113 based on the computation result. Here, the three-dimensional shape model is drawn, but a two-dimensional shape model can be drawn in the same way. The same is true of the following description.

When a simulation for one cycle ends, the simulating computation unit 145 sets the temporary stop mode flag as the time synchronization function flag 141 in the work area 139 of the volatile memory 117 (step S220). Accordingly, the simulation unit 119 transitions to the temporary stop mode, without performing a simulation, and enters the temporary stop state.

The temporary stop mode flag in the time synchronization function flag 141 of the simulation device 100 is a flag indicating that the simulation unit 119 transitions to the temporary stop state in which the simulation is not performed. When the temporary stop mode flag is set, the simulation unit 119 transitions to the temporary stop state. When the temporary stop mode flag is released, that is, when the temporary stop mode flag is switched to an OFF state, the simulation unit 119 transitions to a normal mode in which the simulation is performed from the temporary stop state.

When the temporary stop mode flag is set, the stop release instructing command generating unit 121 generates a stop release instructing command and stores the generated stop release instructing command as the stop release instructing command 143 in the work area 139 of the volatile memory 117.

When the stop release instructing command 143 is stored in the work area 139 of the volatile memory 117, the simulating computation unit 145 transmits the stop release instructing command 143 to the communication unit 225 of the PLC 200 via the communication unit 125 and the communication line 149 (step S230). At this time, cycle 1 which is the first cycle of the simulation process in the simulation system ends.

The communication unit 225 of the PLC 200 receives the stop release instructing command 143 transmitted from the simulation device 100 via the communication line 149 (step S140). The communication unit 225 of the PLC 200 transmits the received stop release instructing command 143 to the reception-data command analyzing unit 223. The reception-data command analyzing unit 223 analyzes the stop release instructing command 143 and converts the stop release instructing command 143 into a format which is usable in the PLC 200. The reception-data command analyzing unit 223 transmits the analyzed stop release instructing command 143 to the command executing engine unit 219.

The command executing engine unit 219 transmits the data-transmission command 243 including the computation result 237 of the user program, which is stored in the work area 239 of the volatile memory 217, to the communication unit 125 of the simulation device 100 via the communication unit 225 and the communication line 149 (step S150).

Upon receiving the analyzed stop release instructing command 143, the command executing engine unit 219 releases the temporary stop mode flag of the time synchronization function flag 241 in the work area 239 (step S160). Accordingly, the command executing engine unit 219 releases the temporary stop mode flag. At this time, cycle 1 which is the first cycle in the PLC 200 ends. Then, the command executing engine unit 219 executes commands of a second cycle of the user program which is a next cycle in the user program and performs a computation.

The function of causing the command executing engine unit 219 to release from the temporary stop state by releasing the temporary stop mode flag is installed in, for example, firmware in advance. Accordingly, processes such as creating a user program by a designer for utilizing the function of causing the command executing engine unit 219 to release from the temporary stop state and changing of the user program are not necessary and a burden is not imposed on the designer.

When the next cycle of computation in the user program ends, the command executing engine unit 219 performs the end process (step S170). In the end process, the command executing engine unit 219 stores a new computation result 237 of the user program in the data memory area 235 of the nonvolatile memory 215.

Thereafter, the PLC 200 returns to the step S120 and repeats processes regarding the user program which is a desired simulation target. The data-transmission command generating unit 221 generates the data-transmission command including the newest computation result 237 of the user program stored in the data memory area 235 and stores the generated data-transmission command as the data-transmission command 243 in the work area 239 of the volatile memory 217.

On the other hand, the communication unit 125 of the simulation device 100 receives the data-transmission command 243 transmitted from the PLC 200 via the communication line 149 (step S240). Upon receiving the data-transmission command 243, the communication unit 125 transmits the received data-transmission command 243 to the data-transmission command analyzing unit 123. The data-transmission command analyzing unit 123 analyzes the data-transmission command 243 and converts the data-transmission command 243 into a format which is usable in the simulation device 100. The data-transmission command analyzing unit 123 stores the computation result of the PLC 200 acquired from the data-transmission command 243 as the computation result 133 of the PLC 200 in the data memory area 131 of the nonvolatile memory 115.

When the computation result 133 of the PLC 200 is stored in the data memory area 131, the simulation unit 119 releases the temporary stop mode flag in the work area 139 of the volatile memory 117 (step S250). Accordingly, the simulation unit 119 releases the temporary stop mode and performs a next one cycle of simulation based on the computation result 133 of the PLC 200 stored in the data memory area 131 (step S260). That is, the simulating computation unit 145 computes simulation of the operation of the device to be controlled based on the computation result 133 of the PLC 200. Then, the drawing unit 147 performs a computation for drawing a three-dimensional shape model of the device to be controlled based on the computation result of the simulating computation unit 145, and draws the three-dimensional shape model on the display unit 113 based on the computation result.

The simulation device 100 returns from step S260 to step S220 and repeats the processes from step S220 whenever the data-transmission command 243 is transmitted from the PLC 200.

In the simulation system according to the first embodiment described above, the PLC 200 temporarily stops a command executing process, that is, a computing process, in the command executing engine unit 219 and stores the result of the computing process of one cycle at the time of end of one cycle, that is, when the end process ends, whenever one cycle of the user program is performed. On the other hand, in the simulation device 100, the simulation unit 119 temporarily stops the simulating process and transmits the stop release instructing command 143 to the PLC 200 when one cycle of simulation ends.

Upon receiving the stop release instructing command 143, the command executing engine unit 219 of the PLC 200 releases the temporary stop state, transmits the result of one cycle of computing process immediately before the temporary stop state to the simulation device 100, executes a next cycle of commands of the user program, and then temporarily stops. When the result of one cycle of computing process is received by the simulation device 100, the simulation unit 119 releases the temporary stop state and starts a next cycle of simulation based on the result of the cycle of computing process. When the simulation process ends, the simulation unit 119 temporarily stops the simulating process and transmits the stop release instructing command 143 to the PLC 200.

By repeatedly performing this process, the command execution start timing of the user program which is a cycle start timing in the PLC 200 can be almost matched with the simulation start timing which is a cycle start timing in the simulation device 100 and it is thus possible to synchronize the processing cycle start timings of the PLC 200 and the simulation device 100 with each other.

One cycle of the PLC 200 includes: the time in which one cycle of the user program is performed; and the time from the temporary stop state starts as the execution of the user program ends until the temporary stop state is released as the stop release instructing command 143 is received. On the other hand, one cycle of the simulation device 100 includes the time until the simulation ends and the stop release instructing command 143 is transmitted to the PLC 200 after the simulation starts.

The timing at which the simulation device 100 transmits the stop release instructing command 143 to the PLC 200 and ends one cycle, and the timing at which the PLC 200 releases the temporary stop state and ends one cycle in response to reception of the stop release instructing command 143, are substantially equal to each other and the time synchronization thereof is achieved. The timing at which the PLC 200 transmits the data-transmission command 243 to the simulation device 100 and starts a next cycle, and the timing at which the simulation device 100 receives the data-transmission command 243 and starts a next cycle, are substantially equal to each other and the time synchronization thereof is achieved.

Therefore, in the simulation system according to the first embodiment, it is possible to synchronize the cycle of the PLC 200 and the cycle of the simulation device 100 with each other. Accordingly, the computation result of the PLC 200 is surely applied to the simulation in the simulation device 100 on cycle by cycle basis. For example, data acquired from the first cycle of computation in the PLC 200 is surely used in the second cycle in the simulation device 100. For example, data acquired from the third cycle of computation in the PLC 200 is surely used in the fourth cycle in the simulation device 100.

Therefore, when the simulation device 100 performs a new cycle, the simulation is performed using the computation result of the PLC 200 in the immediately-previous synchronized cycle. Accordingly, it is possible to prevent an error from occurring in the simulation result in the simulation device 100 due to asynchronization between the cycle of the PLC 200 and the cycle of the simulation device 100, and it is possible to improve the simulation accuracy.

Here, by installing the function of synchronizing the cycle of the PLC 200 with the cycle of the simulation device 100 in a cycle time, that is, the function of setting and releasing the temporary stop state of the command executing engine unit 219, into the PLC 200 in advance, it is possible to reduce a burden on a designer. That is, in the simulation system according to the first embodiment, a designer does not need to synchronize one cycle time of the PLC 200 with one cycle time of the simulation device 100 by correcting the user program of the PLC 200 or the like. Accordingly, in the simulation system according to the first embodiment, a designer does not need to perform operations of correcting or restoring the user program of the PLC 200 to the original state and it is possible to reduce man-hours for debugging the user program and to reduce man-hours for developing the PLC 200.

While the first cycle of the PLC 200 and the first cycle of the simulation device 100 are simultaneously started has been described above, the first cycle of the PLC 200 and the first cycle of the simulation device 100 do not have to be started simultaneously. When the first cycle of the PLC 200 and the first cycle of the simulation device 100 are started at different timings and the first cycle of the PLC 200 ends earlier than the first cycle of the simulation device 100, the PLC 200 transitions to the temporary stop state after the first cycle ends and the above-mentioned processes are performed. Accordingly, from the second cycle, the cycles of the PLC 200 and the cycles of the simulation device 100 are synchronized with each other.

Therefore, according to the first embodiment, it is possible to perform the debugging process of the user program and development of the PLC 200 in a short time by performing a simulation with high accuracy without imposing a burden on a designer.

Second Embodiment

In a second embodiment, a function of switching an operation mode between a simulation operation mode in which the command executing engine unit 219 of the PLC 200 temporarily stops every cycle when executing a user program as described in the first embodiment and a normal operation mode in which the command executing engine unit 219 of the PLC 200 does not temporarily stop every cycle of the user program but continuously performs the user program will be described below.

As described in the first embodiment, the simulation operation mode in which the PLC 200 temporarily stops every cycle in executing the user program is used in the simulation and is not used in running the actual facilities. Accordingly, in actually running the facilities, it is necessary to switch the operation mode of the PLC 200 from the simulation operation mode to the normal operation mode.

The switching of the PLC 200 between the simulation operation mode and the normal operation mode is managed, for example, using the time synchronization function flag 241 in the work area 239 of the volatile memory 217 in the PLC 200. In this case, a simulation operation mode switching flag is provided as the time synchronization function flag 241. The simulation operation mode switching flag is a flag for setting the operation mode of the PLC 200 to the simulation operation mode.

When the simulation operation mode switching flag is set in the time synchronization function flag 241 of the work area 239, the PLC 200 operates in the simulation operation mode described in the first embodiment. On the other hand, when the simulation operation mode switching flag is not set, the PLC 200 operates in the normal operation mode. That is, the command executing engine unit 219 detects the setting state of the simulation operation mode switching flag in the time synchronization function flag 241 of the work area 239 before executing the user program. When the simulation operation mode switching flag is set, the command executing engine unit operates in the simulation operation mode. When the simulation operation mode switching flag is not set, the command executing engine unit 219 operates in the normal operation mode.

Figure 5:
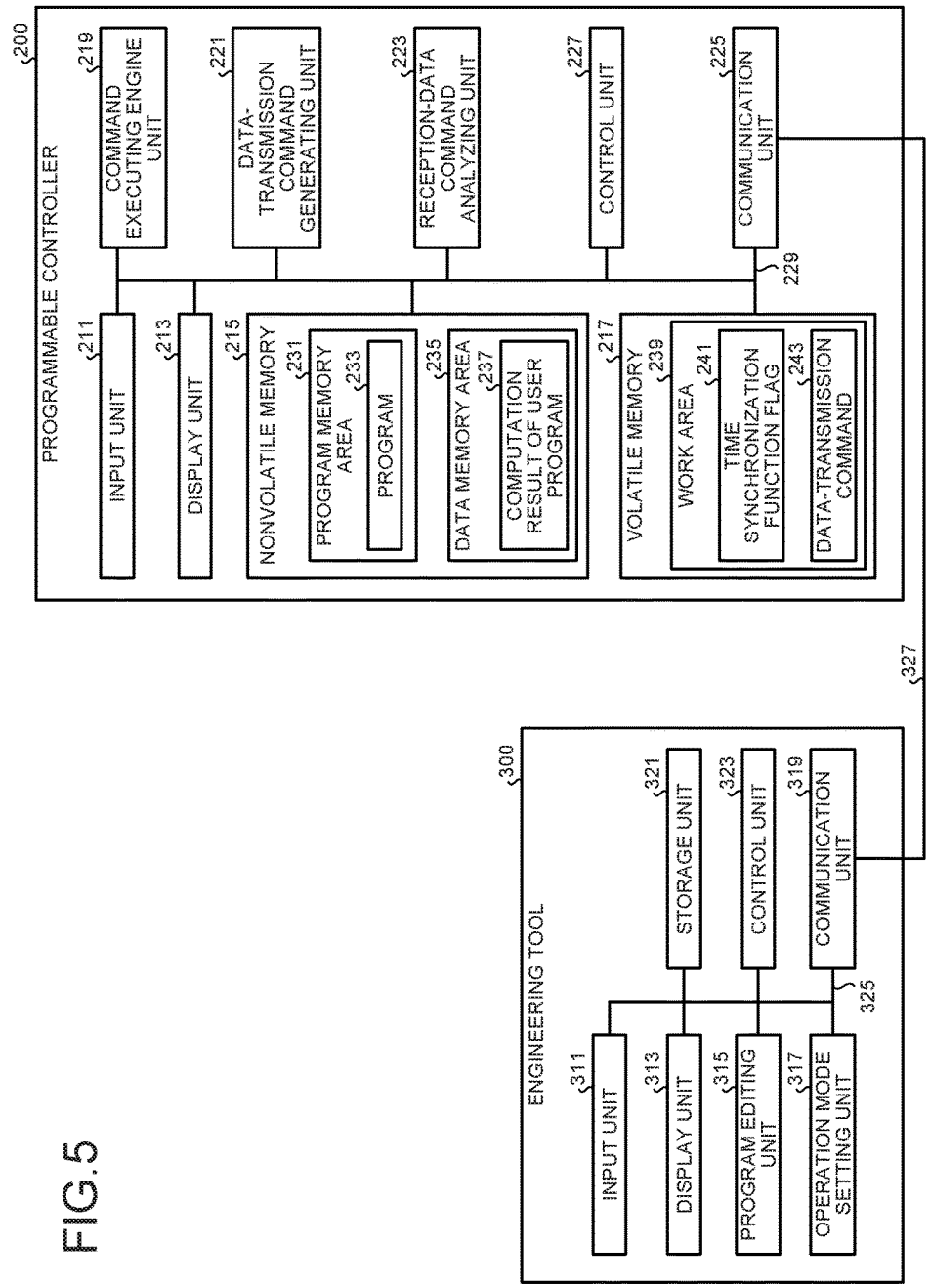
FIG. 5 is a diagram illustrating a configuration of an engineering tool according to a second embodiment of the present invention.

The setting and releasing of the simulation operation mode switching flag can be performed, for example, by an engineering tool 300 that creates and edits the user program of the PLC 200. FIG. 5 is a diagram illustrating the configuration of the engineering tool 300 according to the second embodiment. The engineering tool 300 includes an input unit 311, a display unit 313, a program editing unit 315, an operation mode setting unit 317, a communication unit 319, a storage unit 321, and a control unit 323. These constituent units are connected to each other via an internal bus 325. The engineering tool may be a portable type which can be transported to the installation place of the PLC 200 or may be a stationary type which is installed in a monitoring room or the like.

The input unit 311 is an input means configured to input a variety of information from a designer or an external device.

The display unit 313 is a display means configured to display a variety of information input to and output from the engineering tool 300, such as information for creating and editing a user program and information on setting and releasing of the simulation operation mode switching flag, and an example thereof is an LCD (liquid crystal display device).

The program editing unit 315 creates and edits the user program based on the information input from the input unit 311.

The operation mode setting unit 317 sets and releases the simulation operation mode switching flag in the work area 239 of the PLC 200.

The communication unit 319 communicates with the communication unit 225 of the PLC 200 so as to transmit and receive data between the engineering tool 300 and the PLC 200. The communication unit 319 and the communication unit 225 of the PLC 200 are connected to each other, for example, via a communication line 327. Communication means between the communication unit 319 and the communication unit 225 is not particularly limited.

The storage unit 321 stores information such as various programs for operating the engineering tool 300 and various data generated in various processes in the engineering tool 300.

The control unit 323 controls the processes in the engineering tool 300 as a whole.

When the simulation operation mode switching flag of the PLC 200 is set by the engineering tool 300, for example, a designer inputs information indicating setting of the simulation operation mode switching flag to the engineering tool 300 using the input unit 311. The control unit 323 transmits a setting instructing command instructing to set the simulation operation mode switching flag to the PLC 200 via the communication unit 319 based on the input information.

The communication unit 225 of the PLC 200 receives the setting instructing command transmitted from the engineering tool 300 via the communication line 327. The communication unit 225 of the PLC 200 transmits the received setting instructing command to the reception-data command analyzing unit 223. The reception-data command analyzing unit 223 analyzes the setting instructing command and converts the setting instructing command into a format which is usable in the PLC 200. Then, the reception-data command analyzing unit 223 transmits the analyzed setting instructing command to the control unit 227.

Upon receiving the analyzed setting instructing command, the control unit 227 sets the simulation operation mode switching flag of the time synchronization function flag 241 in the work area 239 of the volatile memory 217 based on the setting instructing command.

In releasing the simulation operation mode switching flag of the PLC 200 by the engineering tool 300, the control unit 323 transmits a release instructing command instructing to release the simulation operation mode switching flag instead of the setting instructing command to the PLC 200 via the communication unit 319. In the PLC 200, the processes are performed in the above-mentioned way, and the control unit 227 releases the simulation operation mode switching flag of the time synchronization function flag 241 in the work area 239 of the volatile memory 217 based on the release instructing command.

The setting and releasing of the simulation operation mode switching flag may also be possible, for example, by storing a program for setting and releasing the simulation operation mode switching flag in the PLC 200. In this case, for example, a designer inputs setting instructing information instructing to set the simulation operation mode switching flag or release instructing information instructing to release the simulation operation mode switching flag to the PLC 200 using the input unit 211. The control unit 227 of the PLC 200 sets or releases the simulation operation mode switching flag of the time synchronization function flag 241 in the work area 239 of the volatile memory 217 based on the setting instructing information or the release instructing information.

As described above, in the second embodiment, the operation mode of the PLC 200 can be easily switched to the simulation operation mode or the normal operation mode using the program for setting and releasing the simulation operation mode switching flag which is stored in the engineering tool 300 or the PLC 200. Accordingly, even a designer who is unfamiliar with the time synchronization method between the simulation device 100 and the PLC 200 can easily switch the operation mode of the PLC 200 to the simulation operation mode or to the normal operation mode.

Third Embodiment

Figure 6:
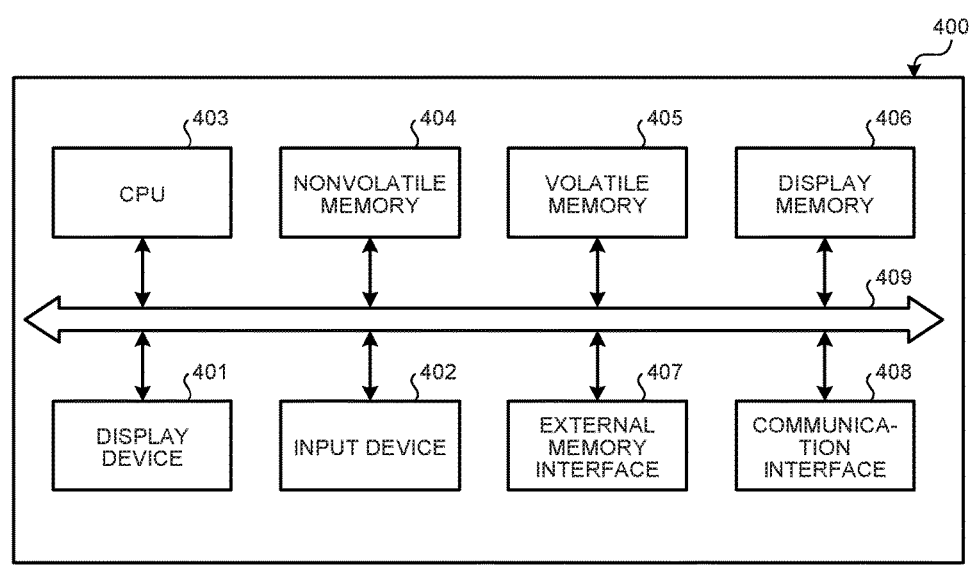
FIG. 6 is a block diagram schematically illustrating an example of a configuration of a computer that realizes functions of the simulation device and the PLC according to the embodiments of the present invention.

The simulation method which is performed in the simulation device 100 and the PLC 200 in the simulation system according to the above-mentioned embodiments can be constructed as a program in which the procedure of the simulation method is stored and can be embodied by causing a computer including a CPU and a storage device to execute the program as illustrated in FIG. 6.

FIG. 6 is a block diagram schematically illustrating an example of a configuration of a computer 400 that realizes the functions of the simulation device 100 and the PLC 200 according to the above-mentioned embodiments. As illustrated in FIG. 6, the computer 400 has a configuration in which a display device 401 such as a liquid crystal display (LCD), an input device 402 such as a keyboard, a CPU 403 that performs a computation, nonvolatile memory 404 such as ROM (read only memory), volatile memory 405 such as RAM (random access memory), a display memory 406 that stores a display screen to be displayed on the display device 401, an external memory interface 407 which is an interface with a detachable external memory such as a flash memory, and a communication interface 408 that communicates with an external device are connected to each other via an internal bus 409.

A program in which the procedure of the simulation method stored in the nonvolatile memory 404 is described is loaded onto the volatile memory 405 and is executed by the CPU 403. The program may be recorded on a computer-readable recording medium such as a hard disk, a compact disk (CD), read only memory (ROM), a magneto-optical disk (MO), or a digital versatile disk or digital video disk (DVD), or the program may be distributed through a network (communication line) such as the Internet. In this case, the program is stored in the nonvolatile memory 404 from an information processing terminal connected thereto via the communication interface 408.

INDUSTRIAL APPLICABILITY

As described above, the simulation system, the programmable controller, the simulation device, and the engineering tool according to the present invention can be usefully used when a debugging process is performed on a user program of a PLC.

REFERENCE SIGNS LIST

100 SIMULATION DEVICE
111 INPUT UNIT
113 DISPLAY UNIT
115 NONVOLATILE MEMORY
117 VOLATILE MEMORY
119 SIMULATION UNIT
121 STOP RELEASE INSTRUCTING COMMAND GENERATING UNIT
123 DATA-TRANSMISSION COMMAND ANALYZING UNIT
125 COMMUNICATION UNIT
127 CONTROL UNIT
129 INTERNAL BUS
131 DATA MEMORY AREA
133 COMPUTATION RESULT OF PLC
135 PROGRAM MEMORY AREA
137 PROGRAM
139 WORK AREA
141 TIME SYNCHRONIZATION FUNCTION FLAG
143 STOP RELEASE INSTRUCTING COMMAND
145 SIMULATING COMPUTATION UNIT
147 DRAWING UNIT
149 COMMUNICATION LINE

200 PROGRAMMABLE CONTROLLER (PLC)
211 INPUT UNIT
213 DISPLAY UNIT
215 NONVOLATILE MEMORY
217 VOLATILE MEMORY
219 COMMAND EXECUTING ENGINE UNIT
221 DATA-TRANSMISSION COMMAND GENERATING UNIT
223 RECEPTION-DATA COMMAND ANALYZING UNIT
225 COMMUNICATION UNIT
227 CONTROL UNIT
229 INTERNAL BUS
231 PROGRAM MEMORY AREA
233 PROGRAM
235 DATA MEMORY AREA
237 COMPUTATION RESULT OF USER PROGRAM
239 WORK AREA
241 TIME SYNCHRONIZATION FUNCTION FLAG
243 DATA-TRANSMISSION COMMAND
300 ENGINEERING TOOL
311 INPUT UNIT
313 DISPLAY UNIT
315 PROGRAM EDITING UNIT
317 OPERATION MODE SETTING UNIT
319 COMMUNICATION UNIT
321 STORAGE UNIT
323 CONTROL UNIT
325 INTERNAL BUS
327 COMMUNICATION LINE
400 COMPUTER
401 DISPLAY DEVICE
402 INPUT DEVICE
403 CPU
404 NONVOLATILE MEMORY
405 VOLATILE MEMORY
406 DISPLAY MEMORY
407 EXTERNAL MEMORY INTERFACE
408 COMMUNICATION INTERFACE
409 INTERNAL BUS

The invention claimed is:

1. A simulation system comprising:
a programmable controller that controls a device to be controlled using a user program, the programmable controller including:
  a computation unit that executes the user program and performs a computing process,
  a storage unit that stores a result of the computing process, and
  a firmware that controls an operation of the programmable controller; and
a simulation device including:
  a simulation unit that performs a simulation of simulating an operation of controlling the device to be controlled by controlling a two-dimensional shape model or a three-dimensional shape model of the device to be controlled, and
  a stop release instructing command generating unit that generates a stop release instructing command,
wherein, when a current cycle of the computing process of the user program ends, the computation unit, in accordance with a control by the firmware, stores the result of the current cycle of the computing process in the storage unit and transitions to a temporary stop state in which a new cycle of the computing process of the user program is not performed,
wherein, in response to receiving from the simulation device the stop release instructing command instructing to release the temporary stop state, the computation unit releases the temporary stop state, transmits the result of the current cycle of the computing process that was executed immediately before the computation unit transitioned to the temporary stop state, to the simulation device, and performs the new cycle of the computing process,
wherein, in response to receiving from the programmable controller the result of the current cycle of the computing process, the simulation unit performs a current cycle of the simulation based on the result of the current cycle of the computing process that was executed immediately before the computation unit transitioned to the temporary stop state,
wherein, when the current cycle of the simulation ends, the simulation unit transitions to the temporary stop state in which a new cycle of the simulation is not performed, and transmits the stop release instructing command to the programmable controller, and
wherein the new cycle of the computing process in the computation unit of the programmable controller and the current cycle of the simulation in the simulation unit proceed in parallel until the computation unit transitions to the temporary stop state after the new cycle of the computing process ends.

2. The simulation system according to claim 1, wherein the simulation unit releases the temporary stop state of the simulation unit and performs the new cycle of the simulation based on the result of the new cycle of the computing process of the user program when the simulation unit receives the result of the new cycle of the computing process of the user program from the programmable controller after transmitting the stop release instructing command to the programmable controller.

3. The simulation system according to claim 1, wherein the computation unit includes a function of switching an operation mode between a first operation mode in which the computation unit transitions to the temporary stop state whenever a cycle of the computing process of the user program is performed and a second operation mode in which the computation unit does not transition to the temporary stop state and continuously performs a plurality of cycles of computing processes of the user program.

4. The simulation system according to claim 1, wherein a start timing of the new cycle of the computing process in the programmable controller is synchronized with a start timing of the current cycle of the simulation in the simulation unit.

5. A programmable controller that is communicatively connected to a simulation device which performs a simulation of simulating an operation of controlling a device to be controlled using a user program, the programmable controller comprising:
a computation unit that executes the user program and performs a computing process; and
a storage unit that stores a result of the computing process; and
a firmware that controls an operation of the programmable controller,
wherein, when a current cycle of the computing process of the user program ends, the computation unit, in accordance with a control by the firmware, stores the result of the current cycle of the computing process in the storage unit and transitions to a temporary stop state in which a new cycle of the computing process of the user program is not performed, wherein, in response to receiving from the simulation device a stop release instructing command instructing to release the temporary stop state, the computation unit releases the temporary stop state and transmits, to the simulation device, the result of the current cycle of the computing process that was executed immediately before transition to the temporary stop state, and performs the new cycle of the computing process, and wherein the new cycle of the computing process in the computation unit of the programmable controller and a current cycle of the simulation in the simulation device proceed in parallel until the computation unit transitions to the temporary stop state after the new cycle of the computing process ends.

6. The programmable controller according to claim 5, wherein the computation unit is configured to switch an operation mode between a simulation operation mode in which the computation unit transitions to the temporary stop state whenever a cycle of the computing process of the user program is performed and a normal operation mode in which the computation unit does not transition to the temporary stop state and continuously performs a plurality of cycles of computing processes of the user program.

7. An engineering tool comprising:
an operation mode setting unit that switches an operation mode of a programmable controller according to claim 5, the operation mode including a first operation mode in which the programmable controller transitions to the temporary stop state in which the new cycle of the computing process is not performed whenever a cycle of the computing process of the user program is performed and a second operation mode in which the programmable controller does not transition to the temporary stop state and continuously performs a plurality of cycles of computing processes of the user program, between the first operation mode and the second operation mode.

* * * * *